(12) United States Patent
Shen et al.

(10) Patent No.: US 11,973,620 B2
(45) Date of Patent: *Apr. 30, 2024

(54) DOWNLINK CONTROL CHANNEL DETECTION METHOD, TERMINAL AND BASE STATION

(71) Applicant: VIVO MOBILE COMMUNICATION CO., LTD., Chang'an Dongguan (CN)

(72) Inventors: Xiaodong Shen, Chang'an Dongguan (CN); Zichao Ji, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 191 days.

This patent is subject to a terminal disclaimer.

(21) Appl. No.: 17/396,065

(22) Filed: Aug. 6, 2021

(65) Prior Publication Data

US 2021/0367813 A1 Nov. 25, 2021

Related U.S. Application Data

(63) Continuation of application No. 16/500,695, filed as application No. PCT/CN2018/081883 on Apr. 4, 2018, now Pat. No. 11,115,243.

(30) Foreign Application Priority Data

Apr. 6, 2017 (CN) .......................... 201710222112.5

(51) Int. Cl.
*H04L 25/02* (2006.01)
*H04L 1/00* (2006.01)
(Continued)

(52) U.S. Cl.
CPC ........ *H04L 25/0238* (2013.01); *H04L 1/0038* (2013.01); *H04L 5/0007* (2013.01); *H04W 72/23* (2023.01); *H04W 72/53* (2023.01)

(58) Field of Classification Search
CPC . H04L 25/0238; H04L 1/0038; H04L 5/0007; H04L 5/0094; H04L 5/0053;
(Continued)

(56) References Cited

U.S. PATENT DOCUMENTS 9,312,997 B2 * 4/2016 Kim ..................... H04L 5/0037
2011/0076962 A1 3/2011 Chen et al.
(Continued)

FOREIGN PATENT DOCUMENTS

CN 102687452 A 9/2012
CN 104054313 A 7/2014
(Continued)

OTHER PUBLICATIONS

EP Search Report in Application No. 18781728.3 dated Feb. 19, 2020.
U.S. Office Action in U.S. Appl. No. 16/500,695 dated Jan. 21, 2021.
(Continued)

*Primary Examiner* — Ayanah S George
(74) *Attorney, Agent, or Firm* — BROOKS KUSHMAN P.C.

(57) ABSTRACT

The present disclosure provides a downlink control channel detection method, a terminal, and a Base Station (BS). The method includes: obtaining first and second auxiliary information from a BS, in which the first auxiliary information indicates a time-domain duration of a Control Resource Set (CORESET) of a downlink control channel, which is allocated by the BS, the second auxiliary information indicates a resource mapping mode from a Resource Element Group (REG) of CORESET to Control Channel Elements (CCE);
(Continued)

performing a blind detection on the downlink control channel, based on the first and second auxiliary information.

20 Claims, 3 Drawing Sheets

(51) Int. Cl.
*H04L 5/00* (2006.01)
*H04W 72/23* (2023.01)
*H04W 72/53* (2023.01)

(58) Field of Classification Search
CPC ...... H04L 25/02; H04W 72/23; H04W 72/53; H04W 72/04; H04W 72/12; H04W 76/28; H04W 52/0216; H04W 72/20; H04W 76/27; H04W 88/04; H04W 92/18
See application file for complete search history.

(56) References Cited

U.S. PATENT DOCUMENTS

| | | | |
|---|---|---|---|
| 2014/0314042 A1 | 10/2014 | Kim et al. | |
| 2014/0328305 A1* | 11/2014 | Kim | H04W 72/541 |
| | | | 370/329 |

FOREIGN PATENT DOCUMENTS

| | | |
|---|---|---|
| CN | 104812079 A | 7/2015 |
| WO | 2011/160589 A1 | 12/2011 |

OTHER PUBLICATIONS

"DL Common Control for NR" 3GPP TSG RAN WG1 Meeting #88, R1-1701584, ZTE, ZTE Microelectronics, Feb. 13, 2017.
Written Opinion and International Search Report in Application No. PCT/CN2018/081883 dated Oct. 17, 2019.

* cited by examiner

DOWNLINK CONTROL CHANNEL DETECTION METHOD, TERMINAL AND BASE STATION

CROSS-REFERENCE TO RELATED APPLICATION

This application is a continuation of U.S. patent application Ser. No. 16/500,695 which is the U.S. national phase of PCT Application No. PCT/CN2018/081883 filed on Apr. 4, 2018, which claims priority to Chinese Patent Application No. 201710222112.5, filed with the National Intellectual Property Administration, PRC on Apr. 6, 2017, which is incorporated herein by reference in its entirety.

TECHNICAL FIELD

The present disclosure relates to the field of communication technologies, and more particularly, to a downlink control channel detection method, a terminal and a Base Station (BS).

BACKGROUND

To make the channel design more flexible, a terminal needs to perform a blind detection on unknown control signaling. Specifically, when one terminal does not learn information about unknown control signaling, such as, physical resource position, size of occupied resources, the terminal performs various exploratory detections through different assumptions, until the control signaling is correctly decoded.

In a Long Term Evolution (LTE) system, a Physical Downlink Control Channel (PDCCH) is used by a BS to transmit Downlink Control Information (DCI). In addition to receiving some system information, a User Equipment (UE) does not receive other information. Subsequently, the UE does not learn the quantity, size, position of Control Channel Elements (CCEs) occupied by the PDCCH, as well as a Downlink Control Indicator (DCI) format for transmitting the CCE. Thus, detection for the DCI in the PDCCH belongs to blind detection.

Firstly, a UE needs to determine which DCI format is carried by the PDCCH. The UE expects to obtain certain DCI, based on current state of the UE. For example, in an idle state, information expected by the UE is paging. When there is uplink data to be transmitted, information expected is a UE scheduling indication (Grant). After initiating a Random Access, the UE expects to obtain a Random Access Response (RAR). For different information, the UE performs a Cyclic Redundancy Check (CRC) on the CCE information, by using a corresponding Radio Network Temporary Identity (RNTI). When the CRC check is successful, the UE learns that such information is needed, and further decodes contents of the DCI based on modulation coding mode.

Secondly, if the UE traverses all the CCEs once, calculation amount of the UE will be very large. Thus, the LTE system divides available CCEs into two kinds of search spaces, e.g., public search space, and UE specific search space. Data transmitted within the public search space mainly includes information, e.g., system information, RAR, paging, and each user needs to search therein. Position of the public search space is fixed (CCE0-CCE6). Besides, Aggregation Level (AL) of the public search space includes 4 and 8. Subsequently, when a user searches in the public search space, starting from CCE0, the user searches 4 times according to AL=4; and the user searches 2 times, according to AL=8. In the UE specific search space, search start point of each user is different. Meanwhile, AL of the UE specific search space includes 1, 2, 4 and 8. When AL=1, 6 searches are performed. When AL=2, 6 searches are performed. When AL=4, 2 searches are performed. When AL=8, 2 searches are performed. The quantity for performing blind detection by the UE may be calculated as follows: 6 searches within the public search space+16 searches within the UE specific search space. When performing the blind detection within PDCCH search space, the UE only needs to try to decode DCI probably occurred, instead of matching with all the DCI formats. For a UE at the same time, there are only two kinds of DCI formats. Subsequently, the total number of PDCCH blind detection will not exceed 44.

The main scene of a New Radio (NR) system includes Enhanced Mobile Broadband (eMBB), massive Machine Type of Communication (mMTC), Ultra Reliable Low Latency Communications (URLLC). These scenes put forward requirements for the system, e.g., high reliability, low latency, large bandwidth, wide coverage. To meet the transmission requirements of foregoing service scenarios, it is necessary to reduce complexity of blind detection performed by the terminal on the downlink control channel.

SUMMARY

Embodiments of the present disclosure provide a method, a terminal, and a base station for detecting a downlink control channel, so as to solve the problem of high complexity in blind detection of a terminal in the related art.

In a first aspect, an embodiment of the present disclosure provides a downlink control channel detection method, applied to a terminal, including: obtaining first auxiliary information and second auxiliary information, wherein the first auxiliary information indicates a time-domain duration of a Control Resource Set (CORESET) of a downlink control channel, which is allocated by a Base Station (BS), the second auxiliary information indicates a resource mapping mode from a Resource Element Group (REG) of the control resource set to a Control Channel Element (CCE); and, performing a blind detection on the downlink control channel, based on the first auxiliary information and the second auxiliary information.

In a second aspect, an embodiment of the present disclosure also provides a downlink control channel detection method, which is applied to a base station, including: allocating a downlink control channel for a terminal; transmitting first auxiliary information to the terminal, based on a time-domain duration of a control resource set of the downlink control channel; and, transmitting second auxiliary information to the terminal, based on a resource mapping mode from an REG of the control resource set to a CCE.

In a third aspect, an embodiment of the present disclosure provides a terminal, including: an obtaining module, configured to obtain first auxiliary information and second auxiliary information, wherein the first auxiliary information indicates a time-domain duration of a control resource set of a downlink control channel, which is allocated by a base station, and the second auxiliary information indicates a resource mapping mode from an REG of the control resource set to a CCE; and, a blind detection module, configured to perform a blind detection on the downlink control channel, based on the first auxiliary information and the second auxiliary information.

In a fourth aspect, an embodiment of the present disclosure provides a base station, including: an allocating module, configured to allocate a corresponding downlink control channel for a terminal; a first transmitting module, configured to transmit first auxiliary information to the terminal, based on a time-domain duration of a control resource set of the downlink control channel; and, a second transmitting module, configured to transmit second auxiliary information to the terminal, based on a resource mapping mode from an REG of the control resource set to a CCE.

In a fifth aspect, an embodiment of the present disclosure provides a terminal, including a processor, a memory, and a computer program stored in the memory, wherein the computer program is executable by the processor, when the computer program is executed by the processor, the processor is caused to perform a downlink control channel detection method in the first aspect.

In a sixth aspect, an embodiment of the present disclosure provides a base station, including a processor, a memory, and a computer program stored in the memory, wherein the computer program is executable by the processor, when the computer program is executed by the processor, the processor is caused to perform a downlink control channel detection method in the second aspect.

In a seventh aspect, an embodiment of the present disclosure provides a computer readable storage medium, which stores a computer program, when the computer program is executed by the processor, the processor is caused to perform a downlink control channel detection method in the first aspect.

In an eighth aspect, an embodiment of the present disclosure provides a computer readable storage medium, which stores a computer program, when the computer program is executed by the processor, the processor is caused to perform a downlink control channel detection method in the second aspect.

Subsequently, in the embodiments of the present disclosure, a terminal jointly determines a blind detection range of a downlink control channel, by combining first auxiliary information and second auxiliary information, and performs a blind detection on a corresponding Control Resource Set (CORESET), so as to reduce complexity of blind detection performed by the terminal on the downlink control channel, in which the first auxiliary information indicates a time-domain duration of a control resource set of the downlink control channel, the second auxiliary information indicates a resource mapping mode from a resource element group REG of the control resource set to a control channel element CCE.

BRIEF DESCRIPTION OF THE DRAWINGS

To describe technical solutions of embodiments in the application more clear, brief descriptions of the drawings used for depicting embodiments of the application will be put forward in the following. It is obvious that, the drawings described in the following are only some embodiments of the application. For persons having ordinary skill in the art, other drawings may be obtained from these drawings without creative work.

DETAILED DESCRIPTION

The exemplary embodiments of the present disclosure will be described in detail in the following, accompanying with attached figures. Although the exemplary embodiments of the present disclosure are displayed in the attached figures, it should be understood that, the present disclosure may be implemented in various forms, instead of being limited by the embodiments described here. On the contrary, these embodiments are provided, so as to facilitate a more thorough understanding of the present disclosure, and fully convey the scope of the present disclosure to those skilled in the art.

Figure 1:
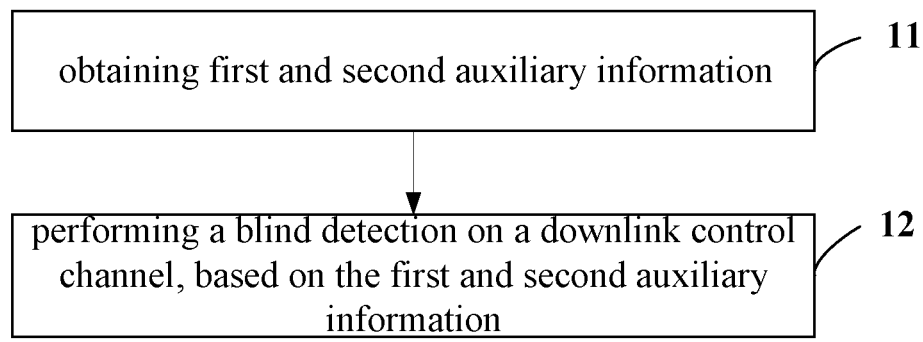
FIG. 1 is a flowchart illustrating a method for detecting a downlink control channel, which is performed at a terminal side, in accordance with an embodiment of the present disclosure.

As shown in FIG. 1, in an embodiment of the present disclosure, a method for detecting a downlink control channel, which is applied to a terminal side, includes the following blocks.

In block 11, a terminal obtains first auxiliary information and second auxiliary information.

The first auxiliary information is configured to indicate a time-domain duration of a control resource set of a downlink control channel allocated by a base station. The second auxiliary information is configured to indicate a resource mapping mode, e.g., from a Resource Element Group (REG) of the control resource set to a Control Channel Element (CCE).

Furthermore, in block 11, the process of obtaining the first auxiliary information from the base station may be implemented as follows: receiving the first auxiliary information from the base station, through a Common Physical Downlink Control Channel (PDCCH) or other control channels. The Common PDCCH (which is also referred to as group Common PDCCH, or UE Common PDCCH) has been introduced to a New Radio (NR) system. In order to reduce the complexity of blind detection, the first auxiliary information may be indicated, by using the Common PDCCH, in which the first auxiliary information is configured to limit a blind-detection range of the downlink control channel. Besides, the first auxiliary information is also configured to indicate a time-domain duration of a control resource set (CORESET) of the downlink control channel. The terminal may reduce some unnecessary blind detection, by using the first auxiliary information, thereby reducing the blind-detection complexity of the terminal to some extent.

Furthermore, in block 11, the process of obtaining the second auxiliary information includes: obtaining the second auxiliary information in a predefined way, or receiving the second auxiliary information, which is configured and transmitted by the base station (e.g., through high-level signaling).

In block 12, the terminal performs a blind detection on a downlink control channel, based on the first auxiliary information and the second auxiliary information.

Specifically, the first auxiliary information indicates the time-domain duration of the control resource set of the downlink control channel, e.g., an indication of CORESET duration. The second auxiliary information indicates whether a resource mapping mode, from REG of the control resource set to CCE, is time-domain first or frequency-domain first. After obtaining the first and second auxiliary information, according to two kinds of information indicated by the first and second auxiliary information, the terminal determines a blind-detection scope, performs a blind-detection on a corresponding control resource set, so as to reduce the complexity of blind detection performed by the terminal on the downlink control channel, and reduce blind-detection power consumption of the terminal.

Furthermore, the downlink control channel, allocated by the base station for the terminal, may correspond to multiple the control resource sets. Subsequently and specifically, block 12 may include the following blocks: performing the blind detection on all the resources, or some resources of the at least one the control resource set of the downlink control channel, based on the first auxiliary information and the second auxiliary information.

That is, on the basis of CORESET duration information in the first auxiliary information, and the resource mapping mode from REG of CORESET to CCE in the second auxiliary information, the terminal determines whether needing to perform the PDCCH blind detection within the CORESET, so as to obtain the expected downlink control signaling, DCI, or determine whether needing to perform the PDCCH blind detection on a part of resources, or all the resources of the CORESET, so as to obtain the expected downlink control signaling, DCI.

Specifically, assume that N is the quantity of time-domain symbols occupied by the control resource set, M1 is the index of the last OFDM symbol in the pre-allocated control resource set, which is pre-allocated by the base station. In the pre-allocated control resource set, the index of the OFDM symbol starts from 1, M1 and N are both integers. Subsequently, when N indicated by the first auxiliary information is less than the first index M1, and the resource mapping mode from REG of control resource set to CCE is time-domain first, in which the resource mapping mode is indicated by the second auxiliary information, the blind detection on all the resources of the control resource set is abandoned. That is, when N<M1, and the resource mapping mode of the first CORESET is time-domain first, the terminal may not perform the PDCCH blind detection on the CORESET.

When the N indicated by the first auxiliary information is greater than, or equal to M1, and the resource mapping mode, indicated by the second auxiliary information, from the REG of the control resource set to the CCE, is time-domain first, the blind detection is performed on all the resources of the control resource set. That is, when N>=M1, and the resource mapping mode of the first CORESET is time-domain first, the terminal needs to perform the PDCCH blind detection on the whole CORESET.

Furthermore, assume that N is the quantity of time-domain symbols occupied by the control resource set, M2 is the index of the first OFDM symbol in the pre-allocated control resource set, which is pre-allocated by the base station, M3 is the index of the last OFDM symbol in the pre-allocated control resource set, the index of the OFDM symbol in the pre-allocated control resource set starts from 1, M2, M3 and N are all integers. Subsequently, when N indicated by the first auxiliary information is less than the second index M2, and the resource mapping mode, indicated by the second auxiliary information, from REG of the control resource set to CCE is frequency-domain first, the blind detection on all the resources of the control resource set is abandoned. That is, when N<M2, and the resource mapping mode of the first CORESET is frequency-domain first, the terminal may not perform the PDCCH blind detection on the CORESET.

When the first auxiliary information indicates that, N is greater than, or equal to M2, N is less than the third index M3, and the second auxiliary information indicates that the resource mapping mode, from REG of control resource set to CCE, is frequency-domain first, the blind detection is performed on some resources occupied by the control resource set. Specifically, when N indicated by the first auxiliary information is greater than or equal to M2, N is less than the third index M3, and the second auxiliary information indicates that the resource mapping mode, from REG of control resource set to CCE, is frequency-domain first, the blind detection is performed on symbols, e.g., from the M2-th OFDM symbol to the N-th OFDM symbol in the control resource set. That is, when M2<=N<M3, and the resource mapping mode of the first CORESET is frequency-domain first, it is necessary to perform the blind detection on the CORESET from the M2-th symbol to the N-th symbol.

When N indicated by the first auxiliary information is greater than, or equal to M3, and the second auxiliary information indicates that the resource mapping mode from REG of control resource set to CCE is frequency-domain first, the blind detection is performed on all the resources occupied by the control resource set. That is, when N>=M3, and the resource mapping mode of the first CORESET is frequency-domain first, the terminal needs to perform the PDCCH blind detection on the whole CORESET.

The foregoing describes a scene where the index of the OFDM symbol in a second CORESET starts from 1. Another scene, where the index starts from 0, will be further described in the following.

Specifically, assume that N is the index of time-domain symbols occupied by the control resource set, Q1 is the index of the last OFDM symbol in a pre-allocated control resource set, which is pre-allocated by a base station; in the pre-allocated control resource set pre-allocated by the base station, the index of the OFDM symbol starts from 0, Q1 and N are both integers. Subsequently, when N indicated by the first auxiliary information is less than the first index Q1+1, and the second auxiliary information indicates that the resource mapping mode, from REG of control resource set to CCE, is time-domain first, the blind detection on all the resources of the control resource set is abandoned. That is, when N<Q1+1, and the resource mapping mode of the first CORESET is time-domain first, the terminal may not perform the PDCCH blind detection on the CORESET.

When N indicated by the first auxiliary information is greater than, or equal to Q1+1, and the second auxiliary information indicates that the resource mapping mode, from REG of control resource set to CCE, is time-domain first, the blind detection is performed on all the resources of the control resource set. That is, when N>=Q1+1, and the resource mapping mode of the first CORESET is time-domain first, the terminal needs to perform the PDCCH blind detection on the whole CORESET.

Furthermore, assume that N is the index of time-domain symbols occupied by the control resource set, Q2 is the index of the first OFDM symbol in the pre-allocated control resource set, which is pre-allocated by the base station, Q3 is the index of the last OFDM symbol in the pre-allocated control resource set, the index of the OFDM symbol in the pre-allocated control resource set starts from 0, Q2, Q3 and N are all integers. Subsequently, when N indicated by the first auxiliary information is less than the second index Q2, and the second auxiliary information indicates that the resource mapping mode, from REG of control resource set to CCE, is frequency-domain first, the blind detection on all the resources of the control resource set is abandoned. That is, when N<Q2, and the resource mapping mode of the first CORESET is frequency-domain first, the terminal may not perform the PDCCH blind detection on the CORESET.

When N indicated by the first auxiliary information is greater than, or equal to Q2, N is less than the third index Q3+1, and the second auxiliary information indicates that the resource mapping mode, from REG of control resource set to CCE, is frequency-domain first, the blind detection is performed on some resources occupied by the control resource set. Specifically, when N indicated by the first auxiliary information is greater than, or equal to Q2, N is less than the third index Q3+1, and the second auxiliary information indicates that the resource mapping mode, from REG of control resource set to CCE, is frequency-domain first, the blind detection is performed on some symbols of the control resource set, e.g., Q2-th OFDM symbol to N-th OFDM symbol. That is, when Q2<=N<Q3+1, and the resource mapping mode of the first CORESET is frequency-domain first, it is necessary to perform the blind detection on some symbols of the CORESET, e.g., Q2-th symbol to N-th symbol.

When N indicated by the first auxiliary information is greater than, or equal to Q3+1, and the second auxiliary information indicates that the resource mapping mode, from REG of control resource set to CCE, is frequency-domain first, the blind detection is performed on all the resources occupied by the control resource set. That is, when N>=Q3+1, and the resource mapping mode of the first CORESET is frequency-domain first, the terminal needs to perform the PDCCH blind detection on the whole CORESET.

Furthermore, after obtaining the first auxiliary information and the second auxiliary information, before performing the blind detection on the downlink control channel, the method further includes: determining a blind-detection priority of each control resource set of the downlink control channel, based on the first auxiliary information and the second auxiliary information; and, performing the blind detection on the downlink control channel, based on the blind-detection priority of each control resource set.

Specifically, determining the blind-detection priority of each control resource set of the downlink control channel, based on the first auxiliary information and the second auxiliary information, includes the following scenes.

In a first scene: assume that N is the index of time-domain symbols occupied by the control resource set, M4 is the index of the last OFDM symbol in a pre-allocated control resource set, which is pre-allocated by a base station; in the pre-allocated control resource set, which is pre-allocated by the base station, the index of the OFDM symbol starts from 1, M4 and N are both integers. Subsequently, when N indicated by the first auxiliary information is greater than, or equal to the fourth index M4, the blind-detection priority of the control resource set of the downlink control channel is determined to be a high priority. When N indicated by the first auxiliary information is less than M4, the blind-detection priority of the control resource set of the downlink control channel is determined to be a low priority. That is, when N>=M4, the CORESET corresponds to the high priority; when N<M4, the CORESET corresponds to the low priority.

In a second scene: assume that N is the index of time-domain symbols occupied by the control resource set, M5 is the index of the last OFDM symbol in a pre-allocated control resource set, which is pre-allocated by a base station, M6 is the index of the first OFDM symbol in the pre-allocated control resource set, the index of OFDM symbol in the pre-allocated control resource set starts from 1, M5, M6 and N are all integers. Subsequently, when N indicated by the first auxiliary information is greater than, or equal to the fifth index M5, the blind-detection priority of the control resource set of the downlink control channel is determined to be a high priority. That is, when N>=M5, no matter whether the resource mapping mode of the CORESET is time-domain first or frequency-domain first, the CORESET corresponds to the high priority.

When N indicated by the first auxiliary information is less than M5, and the second auxiliary information indicates that the resource mapping mode, from REG of control resource set to CCE, is time-domain first, the blind-detection priority of the control resource set of the downlink control channel is a low priority. That is, when N<M5, and the resource mapping mode of the control resource set is time-domain first, the CORESET corresponds to the low priority.

When N indicated by the first auxiliary information is greater than, or equal to the sixth index M6, N is less than M5, and the second auxiliary information indicates that the resource mapping mode, from REG of control resource set to CCE, is frequency-domain first, the blind-detection priority from the (N+1)-th OFDM symbol to the M5-th OFDM symbol in the control resource set is determined to be a low priority, the blind-detection priority from the M6-th OFDM symbol to the N-th OFDM symbol is determined to be a high priority. That is, when M6<=N<M5, and the resource mapping mode of the control resource set is time-domain first, in the CORESET, the M6-th OFDM symbol to the N-th OFDM symbol correspond to the high priority, and the (N+1)-th OFDM symbol to the M5-th OFDM symbol correspond to the low priority.

Foregoing describes scenes, where index starts from 1. Other scenes, where index starts from 0, will be described in the following.

Specifically, in a third scene: assume that N is the index of time-domain symbols occupied by the control resource set, Q4 is the index of the last OFDM symbol in a pre-allocated control resource set, which is pre-allocated by a base station; in the pre-allocated control resource set, which is pre-allocated by the base station, the index of OFDM symbol starts from 0, Q4 and N are both integers. Subsequently, when N indicated by the first auxiliary information is greater than, or equal to the fourth index Q4+1, it is determined that the blind-detection priority of the control resource set of the downlink control channel is a high priority; that is, when N>=Q4+1, the CORESET corresponds to the high priority.

When N indicated by the first auxiliary information is less than Q4+1, it is determined that the blind-detection priority of the control resource set of the downlink control channel is a low priority. That is, when N<Q4+1, the CORESET corresponds to the low priority.

In a fourth scene: assume that N is the index of time-domain symbols occupied by the control resource set, Q5 is the index of the last OFDM symbol in a pre-allocated control resource set, which is pre-allocated by a base station, Q6 is the index of the first OFDM symbol in the pre-allocated control resource set; in the pre-allocated control resource set, the index of the OFDM symbol starts from 0, Q5, Q6 and N are all integers. Subsequently, when N indicated by the first auxiliary information is greater than, or equal to the fifth index Q5+1, it is determined that a blind-detection priority of the control resource set of the downlink control channel is a high priority. That is, when N>=Q5+1, no matter whether the resource mapping mode of the control resource set is a time-domain first or a frequency-domain first, the CORESET corresponds to the high priority.

When N indicated by the first auxiliary information is less than Q5+1, and the second auxiliary information indicates that the resource mapping mode, from REG of control resource set to CCE, is time-domain first, it is determined that the blind-detection priority of the control resource set of the downlink control channel is a low priority. That is, when N<Q5+1, and the resource mapping mode of the control resource set is time-domain first, the CORESET corresponds to the low priority. That is, when Q6<=N<Q5+1, and the resource mapping mode of the control resource set is time-domain first, in the CORESET, the Q6-th OFDM symbol to the N-th OFDM symbol correspond to the high priority, the (N+1)-th OFDM symbol to the (Q5+1)-th OFDM symbol correspond to the low priority.

When N indicated by the first auxiliary information is greater than, or equal to the sixth index Q6, N is less than (Q5+1), and the second auxiliary information indicates that the resource mapping mode, from REG of control resource set to CCE, is frequency-domain first, it is determined that the blind-detection priority from (N+1)-th OFDM symbol to (Q5+1)-th OFDM symbol in the CORESET is a low priority, and the blind-detection priority from Q6-th OFDM symbol to N-th OFDM symbol is a high priority.

The foregoing scenes 1 to 4 describe the method for implicitly obtaining the blind-detection priority information, based on the first auxiliary information and the second auxiliary information. In addition, in an embodiment of the present disclosure, the base station may explicitly indicate blind-detection priority information and then the terminal may obtain the blind-detection priority information. Specifically, block 12 further includes: the terminal obtains third auxiliary information from the base station, in which the third auxiliary information indicates the blind-detection priority of each control resource set of the downlink control channel; and the terminal performs the blind detection on the downlink control channel, based on the first auxiliary information, the second auxiliary information and the third auxiliary information.

In addition to determining the blind-detection scope and strategy, based on the duration of the control resource set, the resource mapping mode of the control resource set, and the blind-detection priority, the terminal may further obtain indication information which indicates the quantity of blind detection, and then determine the strategy of the blind detection.

Specifically, block 12 further includes: the terminal obtains fourth auxiliary information, which indicates blind-detection and aggregation-level configuration of each control resource set of the downlink control channel, and performs the blind detection on the downlink control channel, based on the first auxiliary information, the second auxiliary information, the third auxiliary information and the fourth auxiliary information. That is, a new indication is introduced to the Common PDCCH, or other control channels, so as to assist in determining the quantity of blind detections of the CORESET. The terminal has been configured with one or more CORESET for performing the PDCCH blind detection. The configuration information includes time-frequency position information, and/or, quantity of blind detections of each CORESET. The terminal obtains the quantity of blind detections needing to be performed on the CORESET, after receiving information carried by the common PDCCH, or other control channels. The fourth auxiliary information includes: first information indicating aggregation level of blind detection, and/or, second information indicating the quantity of blind detection at each aggregation level of blind detection.

In the downlink channel detection method provided by embodiments of the present disclosure, the terminal jointly determines a blind-detection scope and a blind-detection strategy of the downlink control channel, according to a time-domain duration of control resource set of the downlink control channel, a resource mapping mode from REG of control resource set to CCE, priority and quantity of blind detection. The terminal further performs the blind detection on a corresponding control resource set, so as to reduce a blind-detection complexity performed by the terminal on the downlink control channel, and save power consumption of the terminal's detection.

Foregoing describes the downlink channel detection method of different scenes in detail, in the following, the embodiment further describes the corresponding terminal, accompanying with attached figures.

Figure 2:
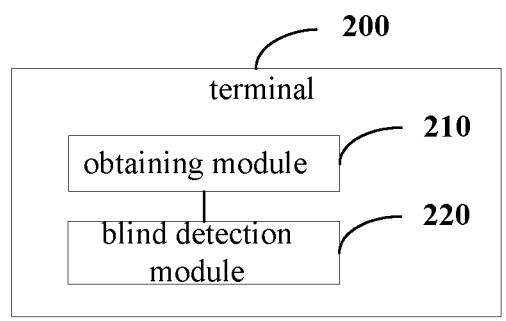
FIG. 2 is a schematic diagram illustrating modules in a terminal, in accordance with an embodiment of the present disclosure.

As shown in FIG. 2, in the embodiment of the application, a terminal 200 may implement details as described in foregoing embodiment, and achieve the same effect, e.g., the terminal obtains first and second auxiliary information from a base station, performs a blind detection on a downlink control channel based on the first and second auxiliary information. The first auxiliary information is configured to indicate a time-domain duration of a control resource set of a downlink control channel, which is allocated by the base station. The second auxiliary information is configured to indicate a resource mapping mode from a REG of the control resource set to CCE. Specifically, the terminal 200 includes the following modules.

An obtaining module 210 is configured to obtain first auxiliary information and second auxiliary information from the base station. The first auxiliary information is configured to indicate a time-domain duration of a control resource set of a downlink control channel, which is actually allocated by the base station. The second auxiliary information is configured to indicate a resource mapping mode, which is from REG of control resource set to CCE.

A blind detection module 220 is configured to perform the blind detection on the downlink control channel, based on the first auxiliary information and the second auxiliary information.

The obtaining module 210 includes a first obtaining sub-module, which is configured to receive the first auxiliary information from the base station, through a common PDCCH, or other control channel.

The obtaining module 210 further includes a second obtaining sub-module, configured to obtain the second auxiliary information by using a pre-defined method, or receive the second auxiliary information configured and transmitted by the base station.

The blind detection module 220 includes a first blind-detection sub-module, configured to perform the blind detection on all the resources, or some resources of at least one control resource set of the downlink control channel, based on the first auxiliary information and second auxiliary information.

The first blind-detection sub-module includes a first blind-detection unit and a second blind-detection unit.

The first blind-detection unit is configured to give up the blind detection performed on all the resources of the control resource set, when N indicated by the first auxiliary information is less than a first index M1, and the second auxiliary information indicates that the resource mapping mode from REG of control resource set to CCE is time-domain first.

The second blind-detection unit is configured to, perform the blind detection on all the resources of the control resource set, when N indicated by the first auxiliary information is greater than, or equal to M1, and the second auxiliary information indicates that the resource mapping mode from REG of control resource set to CCE is time-domain first. N is the quantity of time-domain symbols occupied by the control resource set, M1 is the index of the last OFDM symbol in a pre-allocated control resource set, which is pre-allocated by the base station. The index of OFDM symbols in the pre-allocated control resource set starts from 1, both of M1 and N are integers.

The first blind-detection sub-module further includes a third blind-detection unit, and a fourth blind-detection unit.

The third blind-detection unit is configured to, give up the blind detection on all the resources of the control resource set, when N indicated by the first auxiliary information is less than a first index Q1+1, and the second auxiliary information indicates that the resource mapping mode from REG of control resource set to CCE is time-domain first.

The fourth blind-detection unit is configured to, perform the blind detection on all the resources of the control resource set, when N indicated by the first auxiliary information is greater than, or equal to Q1+1, and the second auxiliary information indicates that the resource mapping mode from REG of control resource set to CCE is time-domain first. N is the quantity of time-domain symbols occupied by the control resource set. Q1 is the index of the last OFDM symbol in the pre-allocated control resource set, which is pre-allocated by the base station. In the pre-allocated control resource set pre-allocated by the base station, the index of OFDM symbol starts from 0, Q1 and N are both integers.

The first blind-detection sub-module further includes a fifth blind-detection unit, a sixth blind-detection unit and a seventh blind-detection unit.

The fifth blind-detection unit is configured to, give up the blind detection on all the resources of the control resource set, when N indicated by the first auxiliary information is less than a second index M2, and the second auxiliary information indicates that the resource mapping mode from REG of control resource set to CCE is frequency-domain first.

The sixth blind-detection unit is configured to perform the blind detection on some resources of the control resource set, when N indicated by the first auxiliary information is greater than, or equal to M2, and N is less than a third index M3, and the second auxiliary information indicates that the resource mapping mode from REG of control resource set to CCE is frequency-domain first.

The seventh blind-detection unit is configured to, perform the blind detection on all the resources occupied by the control resource set, when N indicated by the first auxiliary information is greater than, or equal to M3, and the second auxiliary information indicates that the resource mapping mode from REG of control resource set to CCE is frequency-domain first. N is the quantity of time-domain symbols occupied by the control resource set. M2 is the index of the first OFDM symbol in the pre-allocated control resource set, which is pre-allocated by the base station. M3 is the index of the last OFDM symbol in the pre-allocated control resource set. In the pre-allocated control resource set, index of the OFDM symbols starts from 1. M2, M3 and N are all integers.

The sixth blind-detection unit includes a first blind-detection sub-unit, configured to perform the blind detection on M2-th to N-th OFDM symbols in the control resource set, when N indicated by the first auxiliary information is greater than, or equal to M2, N is less than the third index M3, and the second auxiliary information indicates that the resource mapping mode from REG of control resource set to CCE is frequency-domain first.

The first blind-detection sub-module further includes an eighth blind-detection unit, a ninth blind-detection unit and a tenth blind-detection unit.

The eighth blind-detection unit is configured to, give up the blind detection on all the resources of the control resource set, when N indicated by the first auxiliary information is less than the second index Q2, and the second auxiliary information indicates that the resource mapping mode from REG of control resource set to CCE is frequency-domain first.

The ninth blind-detection unit is configured to, perform the blind detection on some resources occupied by the control resource set, when N indicated by the first auxiliary information is greater than, or equal to Q2, N is less than the third index Q3+1, and the second auxiliary information indicates that the resource mapping mode from REG of control resource set to CCE is frequency-domain first.

The tenth blind-detection unit is configured to, perform the blind detection on all the resources occupied by the control resource set, when N indicated by the first auxiliary information is greater than, or equal to Q3+1, and the second auxiliary information indicates that the resource mapping mode from REG of control resource set to CCE is frequency-domain first. N is the quantity of time-domain symbols occupied by the control resource set. Q2 is the index of the first OFDM symbol in the pre-allocated control resource set, which is pre-allocated by the base station. Q3 is the index of the last OFDM symbol in the pre-allocated control resource set. In the pre-allocated control resource set, the index of the OFDM symbols starts from 0. Q2, Q3 and N are all integers.

The tenth blind-detection unit includes a second blind-detection sub-unit, configured to perform the blind detection on Q2-th to N-th OFDM symbols in the control resource set, when N indicated by the first auxiliary information is greater than, or equal to Q2, N is less than the third index Q3+1, and the second auxiliary information indicates that the resource mapping mode from REG of control resource set to CCE is frequency-domain first.

The blind detection module further includes a processing sub-module, and a second blind-detection sub-module.

The processing sub-module is configured to, determine a blind-detection priority of each control resource set of the downlink control channel, based on the first auxiliary information and the second auxiliary information.

The second blind-detection sub-module is configured to perform the blind detection on the downlink control channel, based on the blind-detection priority of each control resource set.

The processing sub-module includes a first processing unit and a second processing unit.

The first processing unit is configured to, determine that the blind-detection priority of the control resource set of the downlink control channel is a high priority, when N indicated by the first auxiliary information is greater than, or equal to a fourth index M4.

The second processing unit is configured to, determine that the blind-detection priority of the control resource set of the downlink control channel is a low priority, when N indicated by the first auxiliary information is less than M4. N is the quantity of time-domain symbols occupied by the control resource set. M4 is the index of the last OFDM symbol in the pre-allocated control resource set, which is pre-allocated by the base station. In the pre-allocated control resource set pre-allocated by the BS, the index of the OFDM symbols starts from 1, M4 and N are both integers.

The processing sub-module includes a third processing unit and a fourth processing unit.

The third processing unit is configured to, determine that the blind-detection priority of the control resource set of the downlink control channel is a high priority, when N indicated by the first auxiliary information is greater than, or equal to the fourth index Q4+1.

The fourth processing unit is configured to, determine that the blind-detection priority of the control resource set of the downlink control channel is a low priority, when N indicated by the first auxiliary information is less than Q4+1. N is the quantity of time-domain symbols occupied by the CORE-SET. Q4 is the index of the last OFDM symbol in the pre-allocated control resource set, which is pre-allocated by the base station. In the pre-allocated control resource set pre-allocated by the base station, the index of the OFDM symbols starts from 0. Q4 and N are both integers.

The processing sub-module further includes a fifth processing unit, a sixth processing unit and a seventh processing unit.

The fifth processing unit is configured to, determine that the blind-detection priority of the control resource set of the downlink control channel is a high priority, when N indicated by the first auxiliary information is greater than, or equal to the fifth index M5.

The sixth processing unit is configured to, determine that the blind-detection priority of the control resource set of the downlink control channel is a low priority, when N indicated by the first auxiliary information is less than M5, and the second auxiliary information indicates that the resource mapping mode from REG of control resource set to CCE is time-domain first.

The seventh processing unit is configured to, determine that the blind-detection priority of (N+1)-th to M5-th OFDM symbols in the control resource set is a low priority, the blind-detection priority of M6-th to N-th OFDM symbols is a high priority, when N indicated by the first auxiliary information is greater than, or equal to the sixth index M6, N is less than M5, and the second auxiliary information indicates that the resource mapping mode from REG of control resource set to CCE is frequency-domain first. N is the quantity of time-domain symbols occupied by the control resource set. M5 is the index of the last OFDM symbol in the pre-allocated control resource set, which is pre-allocated by the base station. M6 is the index of the first OFDM symbol in the pre-allocated control resource set. In the pre-allocated control resource set, the index of the OFDM symbols starts from 1. M5, M6 and N are all integers.

The processing sub-module further includes an eighth processing unit, a ninth processing unit and a tenth processing unit.

The eighth processing unit is configured to, determine that the blind-detection priority of the control resource set of the downlink control channel is a high priority, when N indicated by the first auxiliary information is greater than, or equal to the fifth index Q5+1.

The ninth processing unit is configured to, determine that the blind-detection priority of the control resource set of the downlink control channel is a low priority, when N indicated by the first auxiliary information is less than Q5+1, and the second auxiliary information indicates that the resource mapping mode from REG of control resource set to CCE is time-domain first.

The tenth processing unit is configured to, determine that the blind-detection priority of (N+1)-th to (Q5+1)-th OFDM symbols in the control resource set is a low priority, the blind-detection priority of Q6-th to N-th OFDM symbols is a high priority, when N indicated by the first auxiliary information is greater than, or equal to the sixth index Q6, N is less than Q5+1, and the second auxiliary information indicates that the resource mapping mode from REG of control resource set to CCE is frequency-domain first. N is the quantity of time-domain symbols occupied by the control resource set. Q5 is the index of the last OFDM symbol in the pre-allocated control resource set, which is pre-allocated by the base station. Q6 is the index of the first OFDM symbol in the pre-allocated control resource set. In the pre-allocated control resource set, the index of the OFDM symbols starts from 0. Q5, Q6 and N are all integers.

The blind detection module further includes a third obtaining sub-module, and a third blind-detection sub-module.

The third obtaining sub-module is configured to obtain third auxiliary information from the base station, in which the third auxiliary information indicates the blind-detection priority of each control resource set of the download control channel.

The third blind-detection sub-module is configured to perform the blind detection on the downlink control channel, based on the first auxiliary information, the second auxiliary information, and the third auxiliary information.

The blind detection module further includes a fourth obtaining sub-module and a fourth blind-detection sub-module.

The fourth obtaining sub-module is configured to obtain fourth auxiliary information from the base station, in which the fourth auxiliary information indicates blind-detection and aggregation-level of each control resource set of the downlink control channel.

The fourth blind-detection sub-module is configured to perform the blind detection on the downlink control channel, based on the first auxiliary information, the second auxiliary information and the fourth auxiliary information.

It should be noted that, in the embodiment of the present disclosure, the terminal jointly determines the scope and strategy of blind-detection, based on the time-domain duration of the control resource set of the downlink control channel, the resource mapping mode from REG of control resource set to CCE, the priority and quantity of blind detection. The terminal performs the blind detection on the corresponding control resource set, so as to reduce blind-detection complexity performed by the terminal on the downlink control channel, and save power consumption of the terminal's detection.

Figure 3:
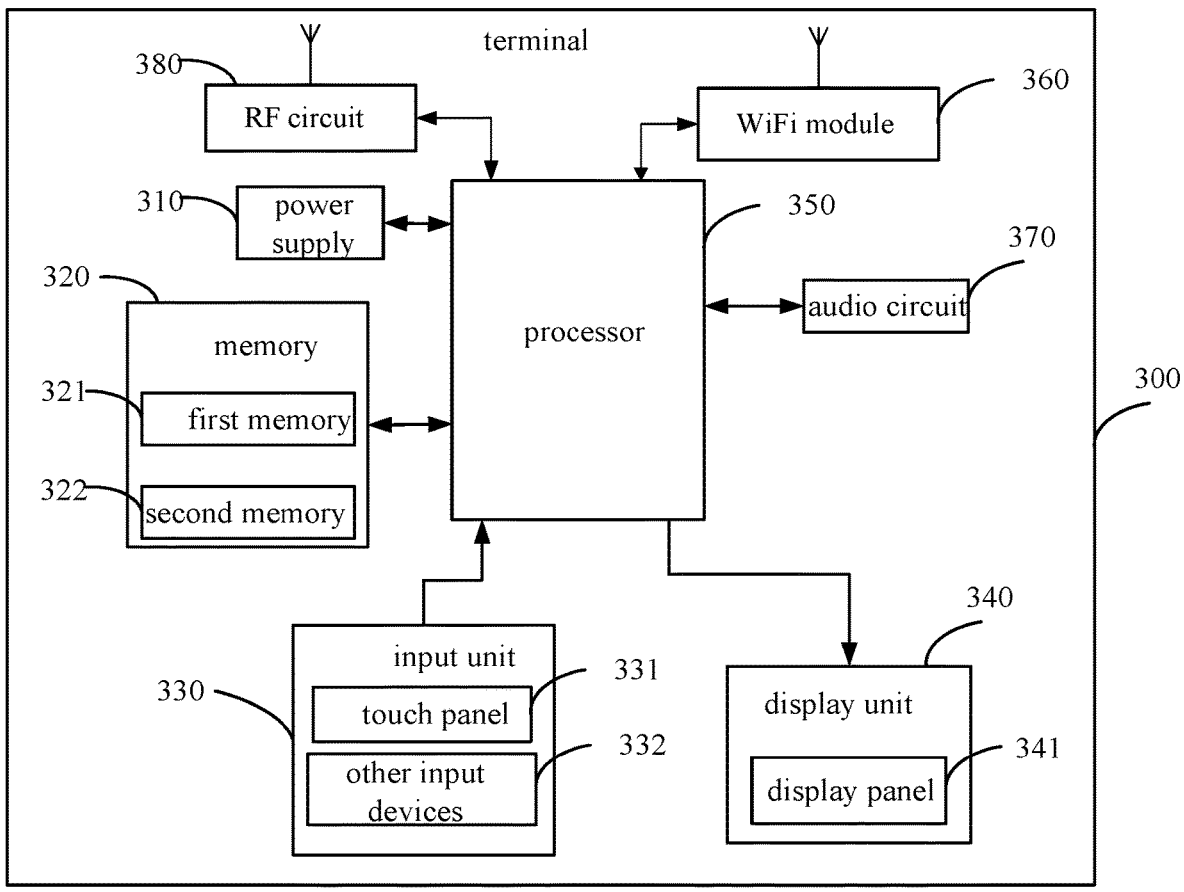
FIG. 3 is a block diagram illustrating a terminal, in accordance with an embodiment of the present disclosure.

FIG. 3 is a schematic diagram illustrating structure of a terminal, in accordance with another embodiment of the present disclosure. Specifically, a terminal 300 shown in FIG. 3 may be a mobile phone, a tablet computer, a Personal Digital Assistant (PDA), or a car computer, and so on.

The terminal 300 shown in FIG. 3 includes a power source 310, a memory 320, an input unit 330, a display unit 340, a processor 350, a Wireless Fidelity (WIFI) module 360, an audio circuit 370 and an RF circuit 380.

The input unit 330 may be configured to receive information inputted by a user, and generate an input of signal, which is relevant with user settings and function control of the terminal 300. Specifically, in the embodiment of the present disclosure, the input unit 330 may include a touch panel 331. The touch panel 331, also referred to as touch screen, may collect touch operations of the user on or around the touch screen (e.g., a user's operations on the touch panel 331 by using a finger, a touch pen, or any appropriate object or attachment), and drive a corresponding connection device, based on a preset program. Optionally, the touch panel 331 may include two parts, e.g., a touch detecting device, and a touch controller. The touch detecting device is configured to detect a touch direction of a user, detect a signal from a touch operation, and transmit the signal to the touch controller. The touch controller is configured to receive touch information from the touch detecting device, convert the touch information to contact coordinates, transmit the contact coordinates to the processor 350, receive and execute a command from the processor 350. In addition, the touch panel 331 may be implemented by various types, such as, resistive, capacitive, infrared, and surface acoustic waves. In addition to the touch panel 331, the input unit 330 may also include other input device 332, which may include, but is not limited to, one or more of a physical keyboard, function keys (such as volume control buttons, switch buttons, etc.), trackball, mouse, joystick, and the like.

The display unit 340 may be configured to display information inputted by the user, or information provided for the user, and various menu interfaces of the terminal. The display unit 340 may include a display panel. Optionally, the display panel 341 may be configured by using LCD, or Organic Light-Emitting Diode (OLED).

It should be noted that, the touch panel 331 may cover the display panel 341 to form a touch display. When the touch display detects a touch operation on, or around it, the touch display transmits to the processor 350, so as to determine the type of the touch event. Subsequently, the processor 350 provides a corresponding visual output on the touch display based on the type of the touch event.

The touch display includes an application interface display area and a common control display area. Arrangements of the application interface display area and common control display area are not limited, which may be two display areas, such as, up and down, left and right. The application interface display area may be configured to display an application interface. Each interface may include interface elements, such as, an icon of at least one application, and/or, widget desktop control, and so on. The application interface display area may also be an empty interface without any content. The common control display area is configured to display highly used controls, e.g., application icons, such as, a setting button, an interface number, a scroll bar, a phone book icon, and so on.

The processor 350 is a control center of the terminal. The processor 350 connects each part of the whole mobile phone, by using various interfaces and lines. The processor 350 performs various functions of the terminal, and processes data, by running or executing software programs, and/or, modules in the first memory 321, and calls data in the second memory 322, so as to perform an overall monitor on the terminal. Optionally, the processor 350 may include one or more processing units.

In the embodiment of the present disclosure, by calling the software programs, and/or, modules in the first memory 321, and data in the second memory 322, the processor 350 is configured to: obtain first and second auxiliary information from a base station, in which the first auxiliary information indicates a time-domain duration of a control resource set of a downlink control channel, which is actually allocated by the base station, the second auxiliary information indicates a resource mapping mode from REG of control resource set to CCE; and, perform a blind detection on the downlink control channel, based on the first auxiliary information and the second auxiliary information.

Specifically, the processor 350 is further configured to: receive the first auxiliary information from the base station, through a Common PDCCH, or other control channel.

Specifically, the processor 350 is further configured to: obtain the second auxiliary information in a predefined way, or receive the second auxiliary information, which is configured and transmitted by the base station.

Specifically, the processor 350 is further configured to: perform the blind detection on all the resources, or some resources of at least one control resource set of the downlink control channel, based on the first auxiliary information and the second auxiliary information.

Specifically, the processor 350 is further configured to give up the blind detection on all the resources of the control resource set, when N indicated by the first auxiliary information is less than the first index M1, and the second auxiliary information indicates that the resource mapping mode from REG of control resource set to CCE is time-domain first; and, perform the blind detection on all the resources of the control resource set, when N indicated by the first auxiliary information is greater than, or equal to M1, and the second auxiliary information indicates that the resource mapping mode from REG of control resource set to CCE is time-domain first. N is the quantity of time-domain symbols occupied by the control resource set. M1 is the index of the last OFDM symbol in a pre-allocated control resource set, which is pre-allocated by the base station. In the pre-allocated control resource set, the index of the OFDM symbols starts from 1. M1 and N are both integers.

Specifically, the processor 350 is further configured to give up the blind detection on all the resources of the control resource set, when N indicated by the first auxiliary information is less than a first index Q1+1, and the second auxiliary information indicates that the resource mapping mode from REG of control resource set to CCE is time-domain first; and, perform the blind detection on all the resources of the control resource set, when N indicated by the first auxiliary information is greater than, or equal to Q1+1, and the second auxiliary information indicates that the resource mapping mode from REG of control resource set to CCE is time-domain first. N is the quantity of time-domain symbols occupied by the control resource set. Q1 is the index of the last OFDM symbol in the pre-allocated control resource set, which is pre-allocated by the base station. In the pre-allocated control resource set pre-allocated by the base station, the index of the OFDM symbols starts from 0. Q1 and N are both integers.

Specifically, the processor 350 is further configured to: give up the blind detection on all the resources of the control resource set, when N indicated by the first auxiliary information is less than a second index M2, and the second auxiliary information indicates that the resource mapping mode from REG of control resource set to CCE is frequency-domain first;

perform the blind detection on some resources occupied by the control resource set, when N indicated by the first auxiliary information is greater than, or equal to M2, N is less than a third index M3, and the second auxiliary information indicates that the resource mapping mode from REG of control resource set to CCE is frequency-domain first; and, perform the blind detection on all the resources occupied by the control resource set, when N indicated by the first auxiliary information is greater than, or equal to M3, and the second auxiliary information indicates that the resource mapping mode from REG of control resource set to CCE is frequency-domain first. N is the quantity of time-domain symbols occupied by the control resource set. M2 is the index of the first OFDM symbol in the pre-allocated control resource set, which is pre-allocated by the base station. M3 is the index of the last OFDM symbol in the pre-allocated control resource set. In the pre-allocated control resource set, the index of the OFDM symbols starts from 1. M2, M3 and N are all integers.

Specifically, the processor 350 is further configured to perform the blind detection on M2-th to N-th OFDM symbols in the control resource set, when N indicated by the first auxiliary information is greater than, or equal to M2, N is less than the third index M3, and the second auxiliary information indicates that the resource mapping mode from REG of control resource set to CCE is frequency-domain first.

Specifically, the processor 350 is further configured to give up the blind detection on all the resources of the control resource set, when N indicated by the first auxiliary information is less than a second index Q2, and the second auxiliary information indicates that the resource mapping mode from REG of control resource set to CCE is frequency-domain first;

perform the blind detection on some resources occupied by the control resource set, when N indicated by the first auxiliary information is greater than, or equal to Q2, and N is less than a third index Q3+1, and the second auxiliary information indicates that the resource mapping mode form REG of control resource set to CCE is frequency-domain first; and, perform the blind detection on all the resources occupied by the control resource set, when N indicated by the first auxiliary information is greater than, or equal to Q3+1, and the second auxiliary information indicates that the resource mapping mode from REG of control resource set to CCE is frequency-domain first. N is the quantity of time-domain symbols occupied by the control resource set. Q2 is the index of the first OFDM symbol in the pre-allocated control resource set, which is pre-allocated by the base station. Q3 is the index of the last OFDM symbol in the pre-allocated control resource set. In the pre-allocated control resource set, the index of the OFDM symbols starts from 0. Q2, Q3 and M are all integers.

Specifically, the processor 350 is further configured to perform the blind detection on Q2-th to N-th OFDM symbols in the control resource set, when N indicated by the first auxiliary information is greater than, or equal to Q2, N is less than the third index Q3+1, and the second auxiliary information indicates that the resource mapping mode from REG of control resource set to CCE is frequency-domain first.

Specifically, the processor 350 is further configured to, determine a blind-detection priority of each control resource set of the downlink control channel, based on the first auxiliary information and the second auxiliary information; and, perform the blind detection on the downlink control channel, based on the blind-detection priority of each control resource set.

Specifically, the processor 350 is further configured to, determine that the blind-detection priority of the control resource set of the downlink control channel is a high priority, when N indicated by the first auxiliary information is greater than, or equal to a fourth index M4; and, determine that the blind-detection priority of the control resource set of the downlink control channel is a low priority, when N indicated by the first auxiliary information is less than M4. N is the quantity of time-domain symbols occupied by the control resource set. M4 is the index of the last OFDM symbol in the pre-allocated control resource set, which is pre-allocated by the base station. In the pre-allocated control resource set pre-allocated by the base station, the index of OFDM symbols starts from 1. M4 and N are both integers.

Specifically, the processor 350 is further configured to, determine that the blind-detection priority of the control resource set of the downlink control channel is a high priority, when N indicated by the first auxiliary information is greater than, or equal to a fourth index Q4+1; and, determine that the blind-detection priority of the control resource set of the downlink control channel is a low priority, when N indicated by the first auxiliary information is less than Q4+1. N is the quantity of time-domain symbols occupied by the control resource set. Q4 is the index of the last OFDM symbol in the pre-allocated control resource set, which is pre-allocated by the base station. In the pre-allocated control resource set pre-allocated by the base station, the index of the OFDM symbols starts from 0. Q4 and N are both integers.

Specifically, the processor 350 is further configured to, determine that the blind-detection priority of the control resource set of the downlink control channel is a high priority, when N indicated by the first auxiliary information is greater than, or equal to a fifth index M5;

determine that the blind-detection priority of the control resource set of the downlink control channel is a low priority, when N indicated by the first auxiliary information is less than M5, and the second auxiliary information indicates that the resource mapping mode from REG of control resource set to CCE is time-domain first; and, determine that the blind-detection priority from (N+1)-th to M5-th OFDM symbols in the control resource set is a low priority, and the blind-detection priority from M6-th to N-th OFDM symbols in the control resource set is a high priority, when N indicated by the first auxiliary information is greater than, or equal to the sixth index M6, N is less than M5, and the second auxiliary information indicates that the resource mapping mode from REG of control resource set to CCE is frequency-domain first. N is the quantity of time-domain symbols occupied by the control resource set. M5 is the index of the last OFDM symbol in the pre-allocated control resource set, which is pre-allocated by the base station. M6 is the index of the first OFDM symbol in the pre-allocated control resource set. In the pre-allocated control resource set, the index of the OFDM symbols start from 1. M5, M6 and N are all integers.

Specifically, the processor 350 is further configured to, determine that the blind-detection priority of the control resource set of the downlink control channel is a high priority, when N indicated by the first auxiliary information is greater than, or equal to the fifth index Q5+1;

determine that the blind-detection priority of the control resource set of the downlink control channel is a low priority, when N indicated by the first auxiliary information is less than Q5+1, and the second auxiliary information indicates that the resource mapping mode from REG of control resource set to CCE is time-domain first; and, determine that the blind-detection priority of (N+1)-th to (Q5+1)-th OFDM symbols in the control resource set is a low priority, the blind-detection priority of Q6-th to N-th OFDM symbols in the control resource set is a high priority, when N indicated by the first auxiliary information is greater than, or equal to Q6, and N is less than Q5+1, and the second auxiliary information indicates that the resource mapping mode from REG of control resource set to CCE is frequency-domain first. N is the quantity of time-domain symbols occupied by the control resource set. Q5 is the index of the last OFDM symbol in the pre-allocated control resource set, which is pre-allocated by the base station. Q6 is the index of the first OFDM symbol in the pre-allocated control resource set. In the pre-allocated control resource set, the index of the OFDM symbols starts from 0. Q5, Q6 and N are all integers.

Specifically, the processor 350 is further configured to obtain from the base station third auxiliary information, which indicates the blind-detection priority of each control resource set of the downlink control channel; and, perform the blind detection on the downlink control channel, based on the first auxiliary information, the second auxiliary information and the third auxiliary information.

Specifically, the processor 350 is further configured to obtain from the base station fourth auxiliary information, which indicates blind-detection and aggregation-level configuration of each control resource set of the downlink control channel, and perform the blind detection on the downlink control channel, based on the first auxiliary information, the second auxiliary information and the fourth auxiliary information.

In the embodiment of the present disclosure, the terminal jointly determines scope and strategy of blind detection performed on the downlink control channel, based on the time-domain duration of the control resource set of the downlink control channel, the resource mapping mode from REG of control resource set to CCE, priority and quantity of blind detection. The terminal performs the blind detection on a corresponding control resource set, so as to reduce blind-detection complexity performed by the terminal on the downlink control channel, and save power consumption of the terminal's detection.

The foregoing embodiment has described the downlink control channel detection method in the present disclosure, from the terminal side. Detailed descriptions about the downlink control detection method at the base station side will be further described in the following, accompanying with attached figures.

Figure 4:
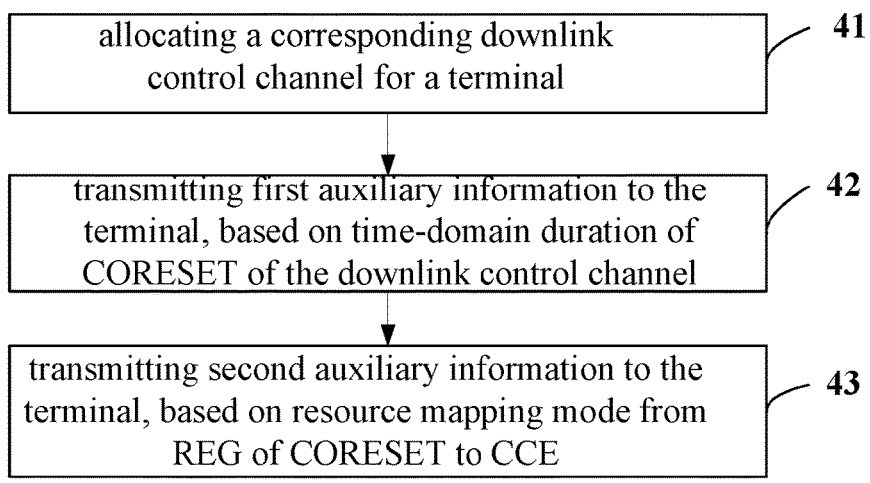
FIG. 4 is a flowchart illustrating a method for detecting a downlink control channel, which is performed at a base station side, in accordance with an embodiment of the present disclosure.

As shown in FIG. 4, in the embodiment of the present disclosure, a downlink control channel detection method includes the following blocks.

In block 41, a base station allocates a corresponding downlink control channel for a terminal.

The base station allocates the corresponding downlink control channel for the terminal, based on information, such as current state of the terminal, current transmission performance, and so on. The base station transmits corresponding Downlink Control Information (DCI) in the downlink control channel, so as to facilitate the terminal to perform subsequent services.

In block 42, the base station transmits first auxiliary information to the terminal, based on a time-domain duration of a control resource set of the downlink control channel.

In order to reduce complexity and quantity of blind detection about the terminal, the base station may transmit the first auxiliary information to the terminal, in which the first auxiliary information indicates the time-domain duration of the control resource set of the scheduled downlink control channel.

Block 42 may be implemented by the following blocks. The base station transmits the first auxiliary information to the terminal, based on resource mapping mode from REG of control resource set to CCE. A New Radio (NR) system has introduced a Common PDCCH, which is also referred to as a group Common PDCCH, or a UE Common PDCCH. In order to reduce the complexity of blind detection, the first auxiliary information may be indicated by the Common PDCCH, and the first auxiliary information is configured to determine the blind-detection scope of the downlink control channel.

In block 43, the base station transmits the second auxiliary information to the terminal, based on the resource mapping mode from REG of control resource set to CCE.

To further reduce the complexity and quantity of the terminal's blind detection, the base station may also transmit to the terminal the second auxiliary information, which indicates the resource mapping mode from REG of control resource set to CCE.

Furthermore, to reduce the blind-detection complexity of the system, and enable the terminal to determine a more precise blind-detection scope and strategy, after block 41 in the embodiment of the present disclosure, the method further includes: the base station transmits third auxiliary information to the terminal, based on blind-detection priority of each control resource set of the downlink control channel.

Similarly, to reduce the blind-detection complexity of the system, and enable the terminal to determine a more precise blind-detection scope and strategy, after block 41 in the embodiment of the present disclosure, the method further includes: the base station transmits fourth auxiliary information to the terminal, based on blind-detection and aggregation-level configuration of each control resource set of the downlink control channel.

In the downlink control channel detection method provided by an embodiment of the present disclosure, the base station transmits to the terminal the first auxiliary information, the second auxiliary information, the third auxiliary information and the fourth auxiliary information, such that the terminal may jointly determine blind-detection scope and strategy of the downlink control channel, and perform the blind detection on a corresponding control resource set, based on time-domain duration of the control resource set of the downlink control channel, the resource mapping mode from REG of control resource set to CCE, the blind-detection priority and quantity thereof. Subsequently, the blind-detection complexity performed by the terminal on the downlink control channel may be reduced, thereby saving power consumption of the terminal's detection.

In foregoing embodiments, the downlink control channel detection method under different scenarios are described. Further descriptions will be provided in the following, accompanying with attached figures and corresponding base station.

Figure 5:
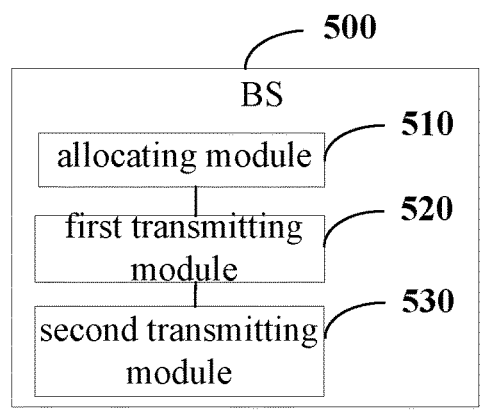
FIG. 5 is a schematic diagram illustrating modules of a base station, in accordance with an embodiment of the present disclosure.

As shown in FIG. 5, in the embodiment of the present disclosure, the base station 500 may implement the functions of the fifth and sixth embodiments as follows: the base station allocates a corresponding downlink control channel for a terminal; the base station transmits the first auxiliary information to the terminal, based on time-domain duration of a control resource set of the downlink control channel; the base station transmits second auxiliary information to the terminal, based on resource mapping mode from REG of control resource set to CCE, and achieves the same effects. Specifically, the base station 500 includes the following functional modules:

an allocating module 510, configured to allocate a corresponding downlink control channel for a terminal;

a first transmitting module 520, configured to transmit first auxiliary information to the terminal, based on a time-domain duration of a control resource set of the downlink control channel; and, a second transmitting module 530, configured to transmit second auxiliary information to the terminal, based on resource mapping mode from REG of control resource set to CCE.

The first transmitting module 520 includes a transmitting sub-module, configured to transmit the first auxiliary information to the terminal, through a Common PDCCH or other control channel, based on the time-domain duration of the control resource set of the downlink control channel.

The base station further includes a third transmitting module, configured to transmit third auxiliary information to the terminal, based on blind-detection priority of each control resource set of the downlink control channel.

The base station further includes a fourth transmitting module, configured to transmit fourth auxiliary information to the terminal, based on blind-detection and aggregation-level configuration of each control resource set of the downlink control channel.

It should be pointed out that, in the embodiment of the present disclosure, the base station transmits to the terminal the first auxiliary information, the second auxiliary information, the third auxiliary information and the fourth auxiliary information, such that the terminal may jointly determine blind-detection scope and strategy of the downlink control channel, and perform a blind detection on a corresponding control resource set, based on time-domain duration of control resource set of the downlink control channel, resource mapping mode from REG of control resource set to CCE, blind-detection priority and quantity thereof. Subsequently, the blind-detection complexity performed by the terminal on the downlink control channel may be reduced, thereby saving power consumption of the terminal's detection.

The Eighth Embodiment

Figure 6:
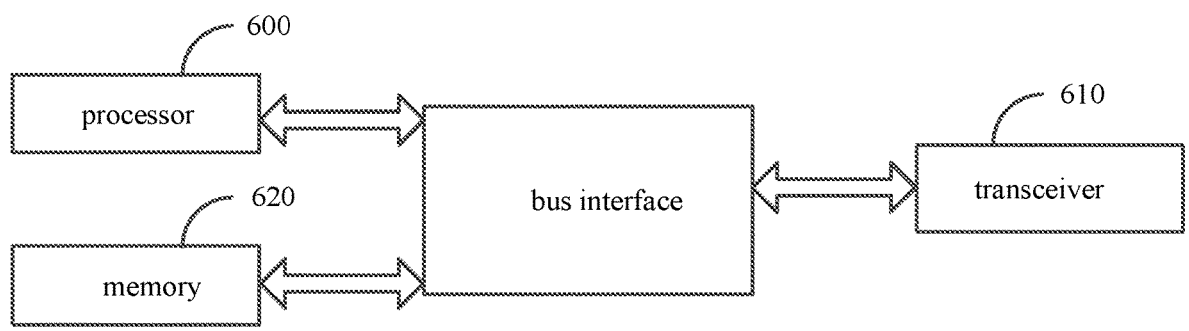
FIG. 6 is a block diagram of a base station, in accordance with an embodiment of the present disclosure.

To better achieve foregoing objectives, as shown in FIG. 6, the fourth embodiment of the present disclosure further provides a base station. The base station includes a processor 600; a memory 620 coupled with the processor 600 via a bus interface, a transceiver 610 coupled with the processor 600 via a bus interface. The memory 620 is configured to store program and data, which may be used when the processor performs operations. The transceiver 610 may be configured to transmit data information or pilots, and receive an uplink control channel. Specifically, when the processor 600 calls and executes programs and data in the memory 620, the processor 600 is configured to read programs from the memory 620, and implements the following functions: allocates a corresponding downlink control channel for a terminal.

The transceiver 610 is configured to receive and transmit data, under the control of the processor 600, and implement the following functions: transmit the first auxiliary information to the terminal, based on time-domain duration of control resource set of the downlink control channel; transmit second auxiliary information to the terminal, based on resource mapping mode from REG of control resource set to CCE.

In FIG. 6, the bus architecture may include any index of interconnected buses and bridges. Specifically, one or more processors demonstrated with processor 600 are coupled with various circuits of memory, which is demonstrated with memory 620. The bus architecture may also link various other circuits, such as, peripherals, voltage regulators, and power management circuits, as is known in the art. Thus, in the application, no further description is provided. The bus interface provides an interface. The transceiver 610 may be composed of multiple components, that is, including a transmitter and a receiver, which provide a unit for communicating with various other devices via the transmitting medium. The processor 600 is in charge of managing bus architecture and general processing. The memory 620 may store data used when the processor 600 performs operations.

Specifically, the processor 600 may be further configured to control the transceiver 610 to transmit the first auxiliary information to the terminal, through a common control channel or other control channels, based on time-domain duration of control resource set of the downlink control channel.

Specifically, the processor 600 is further configured to control the transceiver 610 to transmit the third auxiliary information to the terminal, based on blind-detection priority of each control resource set of the downlink control channel.

Specifically, the processor 600 is further configured to control the transceiver 610 to transmit fourth auxiliary information to the terminal, based on blind-detection and aggregation-level configuration of each control resource set of the downlink control channel.

The base station transmits the first auxiliary information, the second auxiliary information, the third auxiliary information and the fourth auxiliary information to the terminal, such that the terminal may jointly determine blind-detection scope and strategy of downlink control channel, and perform the blind detection on a corresponding control resource set, based on time-domain duration of control resource set of the downlink control channel, resource mapping mode from REG of control resource set to CCE, blind-detection priority and quantity thereof. Subsequently, the blind-detection complexity performed by the terminal on the downlink control channel may be reduced, so as to save power consumption of the terminal's detection.

Persons having ordinary skill in the art may learn that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

In addition, it should be pointed out that, in the device and method of the present disclosure, it is obvious that each component, or each block may be subdivided, and/or, recombined. These subdivision, and/or, recombination should be taken as equivalent solution of the present disclosure. Besides, blocks for performing foregoing series of processes may be executed, according to described time sequence. However, time sequential execution is not necessary. Some blocks may be performed in parallel, or may be executed independently. Persons having ordinary skill in the art may understand that all the blocks, or components, any block or component may be implemented in hardware, firmware, software, or a combination thereof, in any computing device (including a processor, storage medium, and so on), or in a network of computing device, which may be implemented by persons having ordinary skill in the art, after reading descriptions of the present disclosure and using their basic programming skills.

Thus, objectives of the present disclosure may be achieved by running one program, or a group of programs in any computing device. The computing device may be a known common device. Thus, the objectives of the present disclosure may also be implemented by a program product, which includes program codes implementing the method or device. That is, such program product may also form the present disclosure. And, a storage medium storing such program product also form the present disclosure. It is obvious that the storage medium may be any known storage medium, or any storage medium to be developed. It should also be pointed out that, in the devices and methods of the present disclosure, it is obvious that each component, or each block may be further subdivided, and/or, may be recombined. These subdivision, and/or, recombination should be taken as the equivalent solution of the present disclosure. Besides, blocks for executing foregoing series of process may be performed, according to described time sequence. But it is not necessary to perform the blocks according to time sequence. Some blocks may be performed in parallel, or may be performed independently.

Foregoing describes optional implementation modes of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A downlink control channel detection method, applied to a terminal, comprising:
    obtaining first auxiliary information and second auxiliary information, wherein the first auxiliary information indicates a time-domain duration of a control resource set of a downlink control channel, which is allocated by a base station, the second auxiliary information indicates a resource mapping mode from a resource element group (REG) of the control resource set to a control channel elements (CCE); and,
    performing a blind detection on the downlink control channel, based on the first auxiliary information and the second auxiliary information.

2. The method according to claim 1, wherein in the step of obtaining first auxiliary information and second auxiliary information, obtaining the first auxiliary information comprises: receiving the first auxiliary information from the base station, via a common physical downlink control channel (PDCCH), or other control channels.

3. The method according to claim 1, wherein in the step of obtaining first auxiliary information and second auxiliary information, obtaining the second auxiliary information comprises: obtaining the second auxiliary information in a predefined way, or receiving the second auxiliary information which is configured and transmitted by the base station.

4. The method according to claim 1, wherein performing the blind detection on the downlink control channel, based on the first and second auxiliary information, comprises:
    performing the blind detection on all the resources, or some resources of at least one control resource set of the downlink control channel, based on the first auxiliary information and the second auxiliary information.

5. The method according to claim 4, wherein performing the blind detection on all the resources, or some resources of at least one control resource set of the downlink control channel, based on the first auxiliary information and the second auxiliary information comprises:
    when N indicated by the first auxiliary information is less than a first index M1, and the second auxiliary information indicates that the resource mapping mode from REG of control resource set to CCE is time-domain first, giving up the blind detection on all the resources of the control resource set;
    when N indicated by the first auxiliary information is greater than or equal to the first index M1, and the second auxiliary information indicates that the resource mapping mode from REG of control resource set to CCE is time-domain first, performing the blind detection on all the resources of the control resource set; wherein N is the quantity of time-domain symbols occupied by the control resource set, M1 is an index of the last Orthogonal Frequency Division Multiplexing (OFDM) symbol in a pre-allocated control resource set, which is pre-allocated by the base station, indexes of OFDM symbols in the pre-allocated control resource set start from 1, M1 and N are both integers.

6. The method according to claim 1, wherein performing the blind detection on the downlink control channel, based on the first auxiliary information and the second auxiliary information, comprises:
   determining a blind-detection priority of each control resource set of the downlink control channel, based on the first auxiliary information and the second auxiliary information; and,
   performing the blind detection on the downlink control channel, based on the blind-detection priority of each control resource set.

7. The method according to claim 1, wherein performing the blind detection on the downlink control channel, based on the first auxiliary information and the second auxiliary information, further comprises:
   obtaining third auxiliary information from the base station, wherein the third auxiliary information indicates a blind-detection priority of each control resource set of the downlink control channel; and,
   performing the blind-detection on the downlink control channel, based on the first auxiliary information, the second auxiliary information and the third auxiliary information.

8. The method according to claim 1, wherein performing the blind detection on the downlink control channel, based on the first auxiliary information and the second auxiliary information, comprises:
   obtaining fourth auxiliary information from the base station, wherein the fourth auxiliary information indicates a blind-detection and aggregation-level configuration of each control resource set of the downlink control channel; and,
   performing the blind detection on the downlink control channel, based on the first auxiliary information, the second auxiliary information and the fourth auxiliary information.

9. A terminal, comprising a processor, a memory, and a computer program stored in the memory, wherein the computer program is executable by the processor, when the computer program is executed by the processor, the processor is caused to perform:
   obtaining first auxiliary information and second auxiliary information, wherein the first auxiliary information indicates a time-domain duration of a control resource set of a downlink control channel, which is allocated by a base station, the second auxiliary information indicates a resource mapping mode from a resource element group (REG) of the control resource set to a control channel elements (CCE); and,
   performing a blind detection on the downlink control channel, based on the first auxiliary information and the second auxiliary information.

10. The terminal according to claim 9, wherein when the computer program is executed by the processor, the processor is caused to perform: receiving the first auxiliary information from the base station, via a common physical downlink control channel (PDCCH), or other control channels.

11. The terminal according to claim 9, wherein when the computer program is executed by the processor, the processor is caused to perform: obtaining the second auxiliary information in a predefined way, or receiving the second auxiliary information which is configured and transmitted by the base station.

12. The terminal according to claim 9, wherein when the computer program is executed by the processor, the processor is caused to perform:
   performing the blind detection on all the resources, or some resources of at least one control resource set of the downlink control channel, based on the first auxiliary information and the second auxiliary information.

13. The terminal according to claim 12, wherein when the computer program is executed by the processor, the processor is caused to perform:
   when N indicated by the first auxiliary information is less than a first index M1, and the second auxiliary information indicates that the resource mapping mode from REG of control resource set to CCE is time-domain first, giving up the blind detection on all the resources of the control resource set;
   when N indicated by the first auxiliary information is greater than or equal to the first index M1, and the second auxiliary information indicates that the resource mapping mode from REG of control resource set to CCE is time-domain first, performing the blind detection on all the resources of the control resource set; wherein N is the quantity of time-domain symbols occupied by the control resource set, M1 is an index of the last Orthogonal Frequency Division Multiplexing (OFDM) symbol in a pre-allocated control resource set, which is pre-allocated by the base station, indexes of OFDM symbols in the pre-allocated control resource set start from 1, M1 and N are both integers.

14. The terminal according to claim 9, wherein when the computer program is executed by the processor, the processor is caused to perform:
   determining a blind-detection priority of each control resource set of the downlink control channel, based on the first auxiliary information and the second auxiliary information; and,
   performing the blind detection on the downlink control channel, based on the blind-detection priority of each control resource set.

15. The terminal according to claim 9, wherein when the computer program is executed by the processor, the processor is caused to perform:
   obtaining third auxiliary information from the base station, wherein the third auxiliary information indicates a blind-detection priority of each control resource set of the downlink control channel; and,
   performing the blind-detection on the downlink control channel, based on the first auxiliary information, the second auxiliary information and the third auxiliary information.

16. The terminal according to claim 9, wherein when the computer program is executed by the processor, the processor is caused to perform:
   obtaining fourth auxiliary information from the base station, wherein the fourth auxiliary information indicates a blind-detection and aggregation-level configuration of each control resource set of the downlink control channel; and, performing the blind detection on the downlink control channel, based on the first auxiliary information, the second auxiliary information and the fourth auxiliary information.

17. A Base Station (BS), comprising a processor, a memory, and a computer program stored in the memory, wherein the computer program is executable by the processor, when the computer program is executed by the processor, the processor is caused to perform:

allocating a corresponding downlink control channel for a terminal;

transmitting first auxiliary information to the terminal, based on a time-domain duration of a Control Resource Set (CORESET) of the downlink control channel; and, transmitting second auxiliary information to the terminal, based on a resource mapping mode from a Resource Element Group (REG) of the control resource set to a Control Channel Element (CCE).

18. The base station according to claim 17, wherein when the computer program is executed by the processor, the processor is caused to perform:

transmitting the first auxiliary information to the terminal, via a Common Physical Downlink Control Channel (PDCCH) or other control channels, based on the time-domain duration of the control resource set of the downlink control channel.

19. The base station according to claim 17, wherein when the computer program is executed by the processor, the processor is caused to perform: transmitting third auxiliary information to the terminal, based on a blind-detection priority of each control resource set of the downlink control channel.

20. The base station according to claim 17, wherein when the computer program is executed by the processor, the processor is caused to perform:

transmitting fourth auxiliary information to the terminal, based on a blind-detection and aggregation-level configuration of each control resource set of the downlink control channel.

* * * * *